United States Patent [19]

Katayama et al.

[11] Patent Number: 5,287,843
[45] Date of Patent: Feb. 22, 1994

[54] SLICING MACHINE EMPLOYING AN AXIAL FORCE TO PROVIDE RIGIDITY TO A ROTARY BLADE

[75] Inventors: Ichiro Katayama; Yoshio Kamoshita, both of Mitaka, Japan

[73] Assignee: Tokyo Seimitsu Co., Ltd., Tokyo, Japan

[21] Appl. No.: 918,760

[22] Filed: Jul. 27, 1992

Related U.S. Application Data

[62] Division of Ser. No. 693,568, Apr. 30, 1991, Pat. No. 5,174,270.

[30] Foreign Application Priority Data

May 10, 1990 [JP]  Japan .................................. 2-120370
Mar. 25, 1991 [JP]  Japan .................................. 3-060329

[51] Int. Cl.⁵ ............................................. B28D 1/04
[52] U.S. Cl. .................................. 125/13.02; 125/20; 125/901; 83/74; 51/73 R
[58] Field of Search .................. 125/13.02, 20, 901; 51/73 R; 83/74; 82/59

[56] References Cited

U.S. PATENT DOCUMENTS 3,762,008 10/1973  Volki et al. ..................... 125/13.02
4,502,459  3/1985  Dyer .
4,844,047  7/1989  Brehm et al. ........................ 125/20
4,991,475  2/1991  Malcok et al. .................. 125/13.02

FOREIGN PATENT DOCUMENTS 0313714  5/1989  European Pat. Off. .
1502455  6/1969  Fed. Rep. of Germany .
61-98513  5/1986  Japan .
61-122811  8/1986  Japan .
62-225308 10/1987  Japan .
1-110105  4/1989  Japan .

*Primary Examiner*—Jack Lavinder
*Attorney, Agent, or Firm*—Oliff & Berridge

[57] ABSTRACT

A slicing machine for slicing an ingot using a rotary blade that maintains the inner peripheral cutting edge of the blade in a highly rigid state. The slicing machine slices the ingot into thin pieces by use of an inner peripheral cutting edge of a doughnut-shaped rotary blade in which an axial force is applied to the blade prior to slicing in order to displace the blade in an axial direction. The inner peripheral cutting edge of the blade is kept rigid and the ingot is sliced accurately. The displacement of the blade is stored and controlled by a control unit.

13 Claims, 6 Drawing Sheets

SLICING MACHINE EMPLOYING AN AXIAL FORCE TO PROVIDE RIGIDITY TO A ROTARY BLADE

This is a division of application Ser. No. 07/693,568 filed Apr. 30, 1991 now U.S. Pat. No. 5,174,270.

BACKGROUND OF THE INVENTION

1. Field of the Invention

The present invention relates to a slicing machine and a slicing method by use of the slicing machine and, in particular, to such slicing machine and method in which a semiconductor ingot is sliced out into thin pieces to manufacture semiconductor wafers.

2. Description of the Related Art

In a slicing machine, an inner peripheral cutting edge blade or an outer peripheral cutting edge blade is rotated at a high speed and the rotating blade is then pressed against a semiconductor ingot to thereby manufacture semiconductor wafers. In this case, from the viewpoint of the yield rate of the semiconductor wafers and post treatment operation thereof, it is advantageous to minimize the displacements of the blade during cutting as much as possible to thereby reduce the degree of curving of the wafers.

However, recently, a semiconductor wafer having an increased diameter has been demanded, requiring a blade having an increased diameter. Due to the increased diameter of the blade, the cutting position of the blade during the cutting operation thereof may be varied, causing the wafer surface to be curved. In addition to this, the surface of the wafer sliced may be curved due to the uneven shapes of the cutting edge, clogging in the cutting edge, the surface tension of a grinding solution, the variable cutting resistances and the like.

Under these circumstances, conventionally, there have been proposed various measures to prevent curving of the wafer caused by the cutting operation of the rotating blade.

For example, in Publication of Japanese Patent Application Laid-open (Tokkai) No. 61-98513, there are provided air nozzles on both sides of the surface of a blade and there are disposed blade sensors respectively adjacent to the air nozzles. The position of the blade, in which the blade is in a non-loaded state, is set as a zero position. If the blade sensor detects the amount of displacement of the blade from the zero position and the direction of displacement thereof, then air is injected from the air nozzle to thereby correct and thus eliminate the displacement.

Also, in Publication of Japanese Patent Application Laid-open (Tokkai) No. 62-225308, there are provided cooling/lubricating water supply nozzles on both sides of the surface of a blade and there are disposed blade sensors respectively adjacent to the nozzles. If any displacement of the blade is detected, then in a similar manner to the above-mentioned Publication of Japanese Patent Application Laid-open (Tokkai) No. 61-98513, cooling/lubricating water is injected out -to the blade - to thereby correct the displacement of the blade.

Further, in Publication of Japanese Patent Application Laid-open (Tokkai) No. 1-110105, there are provided negative pressure suction type nozzles on both sides of the surface of a blade and there are disposed blade sensors respectively adjacent to the nozzles. In this arrangement, if the blade sensor detects the displacement of the blade, then air is blown out from the negative pressure suction nozzle disposed opposed to the direction of the displacement of the blade to produce a negative pressure to thereby correct the displacement of the blade.

In addition, in Publication of Japanese Utility Model Application Laid-open (Jikkai) No. 61-122811, an ingot or a blade is arranged such that it can be moved in the axial direction thereof, and there is provided a blade sensor which is used to detect the axial displacement of the blade. In this arrangement, if any displacement of the blade is detected in accordance with a signal from the blade sensor, then the ingot or blade is moved in the axial direction thereof to thereby correct the axial displacement of the blade.

As described above, in the above conventional slicing methods by use of a slicing machine, the position of the blade before cutting is set as the zero position and, by detecting any displacement (or curving) in a plus direction or in a minus direction from the zero position by use of the blade sensor, the nozzle or the like is used to return the displacement to the zero position to thereby correct the displacement of the blade.

However, the inner peripheral cutting edge blade exerts its tension by extending up the outer peripheries and thus the portions of the blade around the inner peripheral cutting edge are weaker in rigidity than the outer peripheries of the blade. For this reason, when sliced in a weaker rigidity state, the wafer sliced is easy to curve and the curving cannot be corrected sufficiently because of the weak rigidity, with the result that it is hard to obtain a working accuracy necessary for the wafer.

SUMMARY OF THE INVENTION

The present invention aims at eliminating the drawbacks found in the above-mentioned conventional slicing machines and slicing method by use of such machines.

Accordingly, it is an object of the invention to provide a slicing machine and a slicing method by use of the same in which a blade includes a portion around its inner peripheral cutting edge having a sufficient rigidity so that a wafer sliced can be machined with high accuracy.

In order to achieve the above object, according to the invention, there is provided a slicing machine for slicing a crystal ingot into thin pieces by use of the inner peripheral cutting edge of a doughnut-shaped rotary blade, in which prior to the slicing an axial force is previously applied to the rotary blade to thereby displace the rotary blade in the axial direction and, with the rotary blade being held in the thus axially displaced condition, the crystal ingot is then sliced.

According to the invention, an axial force is applied to the portion of the blade existing around the inner peripheral cutting edge thereof to thereby bend the same blade portion and, while maintaining the blade in such bent condition, the ingot is sliced. Due to the f act that the blade has been previously bent, the blade is increased in rigidity and thus the curving of the blade during slicing can be reduced to a minimum. Also, the increased rigidity allows easy position control of the inner peripheral cutting edge during cutting.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a slicing machine and a slicing method by use of the slicing machine according to the present invention with reference to the accompanying drawings.

Figure 1:
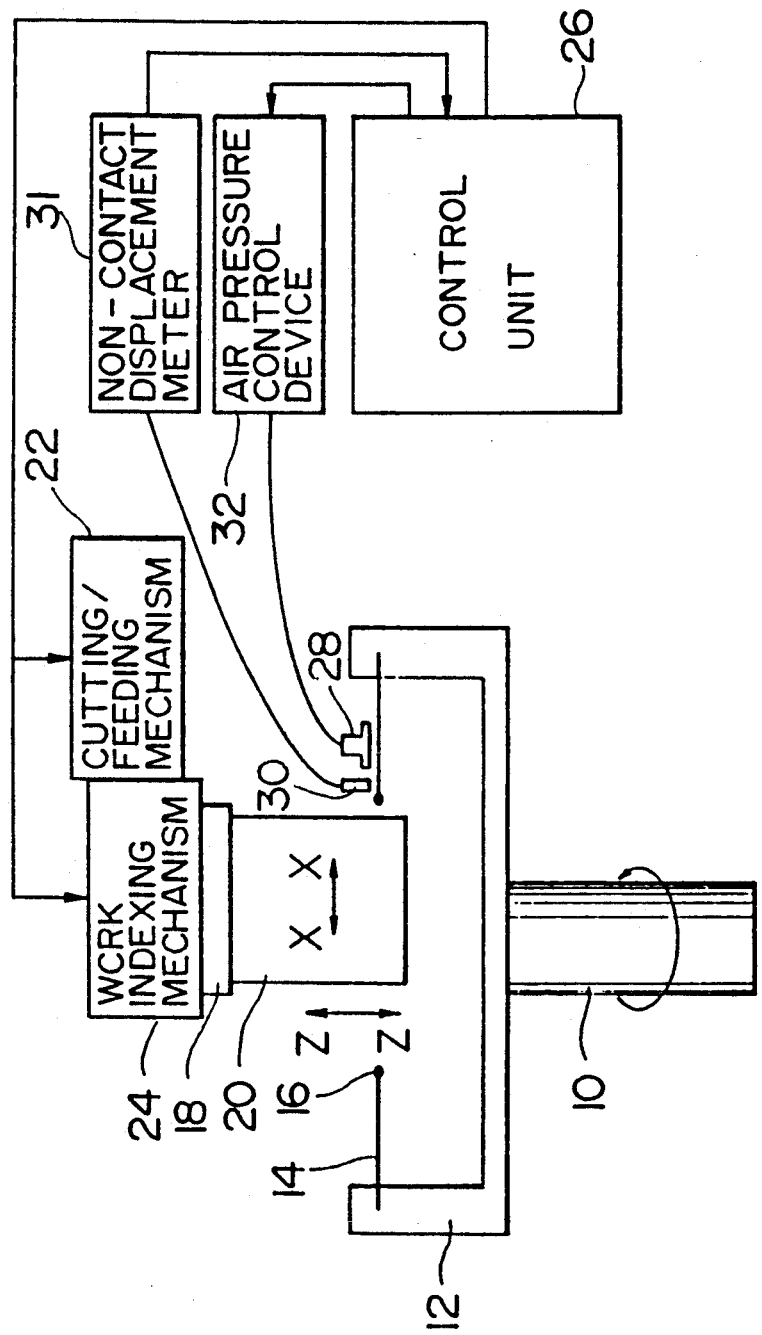
FIG. 1 is a block diagram of a slicing machine, illustrating a slicing method by use of the slicing machine according to the invention.

Referring to FIG. 1, an embodiment of a slicing machine according to the present invention is shown, in which a spindle is designated by 10 and a chuck body 12 is fixedly secured to the upper end portion of the spindle 10, while the lower end portion of the spindle 10 is connected to a motor (not shown). The spindle 10 and chuck body 12 can be rotated by means of the motor. The slicing machine also includes a doughnut-shaped blade 14 the outer peripheral edge of which is stretched up onto the chuck body 12. The blade 14 includes an inner peripheral cutting edge 16 along the inner peripheral edge portion thereof. The inner peripheral cutting edge 16 is made up of fine diamond grains and the like. The blade 14 is also arranged such that the tension of the outer peripheral edge thereof can be adjusted by a well known stretching mechanism (not shown) provided in the chuck body 12.

Figure 2:
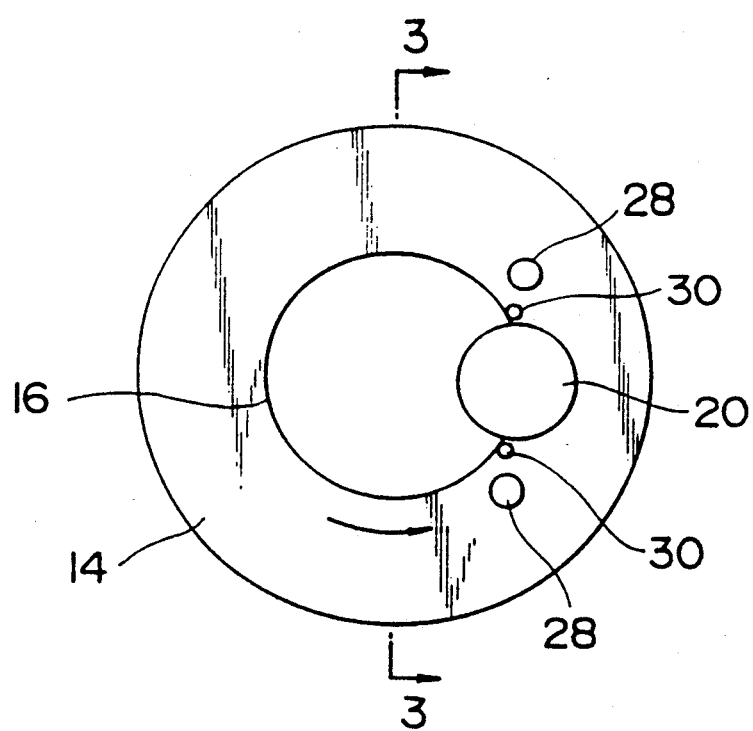
FIG. 2 is a plan view of the slicing machine in FIG. 1.
Figure 3:
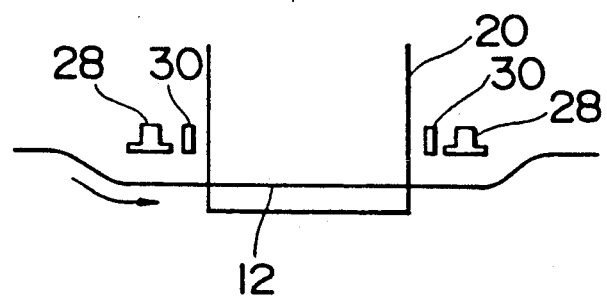
FIG. 3 is a general section view taken along the line 3—3 in FIG. 2.

In FIG. 1, a lower surface of a work support base 18 is fixedly secured to an upper end portion of a semiconductor ingot 20. The work support base 18 can be moved in a cutting/feeding direction (that is, a direction of X—X) by a cutting/feeding mechanism 22 and can also be moved in a work indexing direction (that is, a direction of Z—Z) by a work indexing mechanism 24. The cutting/feeding mechanism 22 and work indexing mechanism 24 can be driven by means of instruction signals from a control unit 26. Also, as shown in FIG. 2, a pair of air pads 28, 28 are disposed on the upper surface of the blade 14. Further, a pair of blade sensors 30, 30 each of a non-contact type are disposed adjacent to the air pads 28, 28, respectively. As shown in FIG. 2, the air pads 28, 28 and blade sensors 30, 30 are disposed such that they are situated on both sides of the ingot 20 while it is being sliced. And, the air pad 28 and blade sensor 30 are disposed such that they are positioned adjacent to the inner peripheral cutting edge 16 of the blade 14. For this reason, if air is injected out from the air pads 28, 28, then the inner peripheral cutting edge 16 of the blade 14 is bent downwardly, as shown in FIG. 3.

The air pads, 28, 28 are connected to an air pressure control device 32 shown in FIG. 1 and the air pressure control device 32 can be controlled by an instruction signal from the control unit 26. Also, signals from the blade sensors 30, 30 are input to the control unit 26 by means of a non-contact displacement meter 31. The control unit 26 is adapted such that it can control the air pressure control device 32 in accordance with the signals from the blade sensors 30, 30.

The slicing machine described above can be used with the following slicing method according to the present invention.

First, the blade 14 is stretched with a predetermined tension by the blade stretching mechanism of the chuck body 12. However, due to the fact that the blade 14 is stretched up by applying a pressure to the outer peripheral edge of the blade 14, the rigidity of the portion of blade 14 around the inner peripheral cutting edge 16 is smaller than that of the outer peripheral edge of the blade 14, and it has been empirically known that the rigidity of the portion of the blade 14 around the inner peripheral cutting edge 16 is not sufficient for the accuracy that is required for a wafer to be sliced. For this reason, according to the prior art slicing method, there is a possibility that the wafer can be curved during slicing and, in order to correct such curving, there is provided an air nozzle or the like but it has been known that the position of the inner peripheral cutting edge cannot be controlled sufficiently. To overcome these problems found in the prior art, the present invention, injects air having a predetermined pressure after the blade is stretched from the air pads 28, 28 prior to slicing. As a result, as shown in FIG. 3, the blade 14 is bent downwardly. In this state, the portion of the blade 14 around the inner peripheral cutting edge 16 has sufficient rigidity and the slicing operation begins with the downwardly bent position of the blade being used as a reference position. The position of the blade 14 is detected by the blade sensors 30, 30 and stored by the control unit 26.

In this state, the cutting/feeding mechanism 22 is put into operation and the work support base 18 is moved towards the inner peripheral cutting edge 16. If the slicing operation is then carried out, sufficient rigidity is given to the inner peripheral cutting edge 16 to stabilize the slicing position of the inner peripheral cutting edge 16 to reduce the displacements of the inner peripheral cutting edge 16 caused by the surface tension and the like when compared with conventional slicing methods. In this case, since the inner peripheral cutting edge 16 is pushed down, the blade 14 is inclined with respect to the cutting line of the wafer, whereby the possibility of surface tension in the blade is reduced. Also, when any curving occurs, the position of the inner peripheral cutting edge 16 can be detected by blade sensors 30, 30, and the air pressure control device 32 can control air injection to return the blade to the stored reference position. This control can be achieved with high accuracy due to the sufficient rigidity of the blade 14.

Also, although air pressure from the air pads 28, 28 is controlled by air pressure control device 32 in the above-mentioned embodiment, other types of air pressure control devices (such as 50, 52 or 54 respectively shown in FIGS. 5, 6 or 7) can be used for this Air pressure control devices 50, 52, or 54 are described below with reference to FIGS. 5, 6 or 7 respectively. In these figures, the same or similar parts to those used in the above-mentioned embodiment are given the same designations and the description thereof is omitted here.

Figure 5:
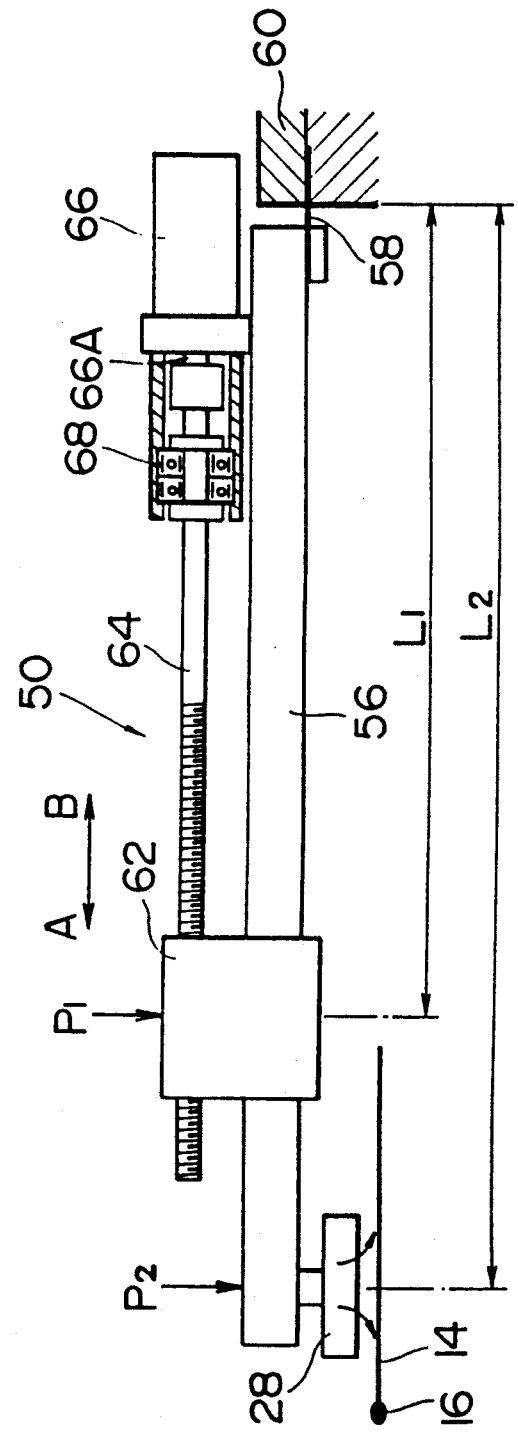
FIG. 5 is a side view of another embodiment of an air pressure control device included in the slicing machine shown in FIG. 1 used to enforce the slicing method.

The air pressure control device 50 includes a beam 56 which is supported in a cantilever way by a slicing machine main body 60 by means of a plate spring 58. The beam 56 includes a weight 62 which can be moved freely. A shaft 64 is threadedly engaged with the weight 62 and is also coaxially connected to a rotary shaft 66A of a motor 66. The motor 66 is fixed to the right end portion of the beam 56. Also, in the left end portion of the beam 56 there is provided an air pad 28. Here, if the weight of the weight 62 is expressed by P1 and the weight of the weight 62 acting onto the air pad 28 is expressed by P2, then an equation holds between P1 and P2:

$$P2 = (L1/L2)P1$$

where L1 represents a distance from the right end of the slicing machine main body 60 to the center of the weight 62, and L2 represents a distance from the right end of the slicing machine main body 60 to the center of the air pad 28, as shown in FIG. 5.

According to the air pressure control device 50, if the motor is rotated, then the weight 62 is moved along the beam 56 in a direction of arrows A - B. For this reason, if the weight 62 is moved in a direction of an arrow A, then L1 is increased to increase the value of P2 in accordance with the relation expressed by the equation, P2 (L1/L2) P1. As a result of this, the beam 56 is rotated counterclockwise against the energizing force of the plate spring 58. This allows the air pad 28 to come near to the blade 14 (that is, a clearance between the air pad 28 and blade 14 is decreased) to thereby increase the pressure of the air that is jetted out from the air pad 28 to the blade 14, so that the blade 14 is further flexed and thus is given sufficient rigidity.

Also, if the weight 62 is moved in a direction of an arrow B, then L1 is reduced to thereby decrease the value of P2, so that the clearance between the air pad 28 and blade 14 is increased. For this reason, the pressure of the air that is jetted out from the air pad 28 to the blade 14 is lowered. In this manner, the air pressure control device 50 is able to control the rigidity of the blade 14 by moving the weight 62. In FIG. 5, reference numeral 68 designates a bearing which supports the shaft 64 in a freely rotatable manner.

Figure 6:
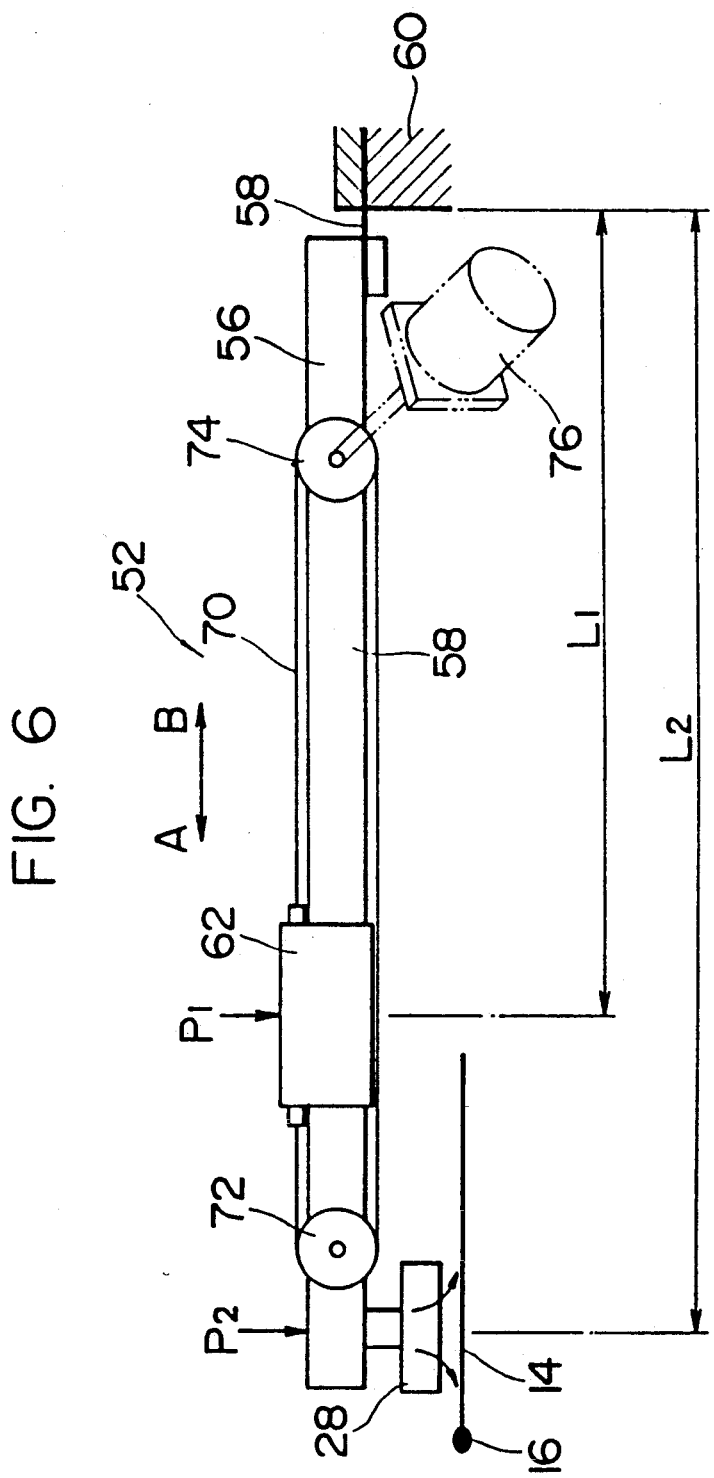
FIG. 6 is a side view of a modification of the embodiment shown in FIG. 5.

Referring now to FIG. 6, there is shown an air pressure control device 52. The air pressure control device 52 is similar to the above-mentioned air pressure control device 52 in that the beam 56 is supported by the slicing machine main body 60 in a cantilever way by means of the plate spring 58 and the weight 62 is provided in the beam 56 in a freely movable manner. However, the air pressure control device 52 is different from the air pressure control device 50 in that the weight 62 is moved by means of a belt 70. In other words, the weight 62 is connected to belt 70 and belt 70 is stretched over pulleys 72 and 74. Pulleys 72 and 74 are provided at a given distance from each other and are supported by the beam 56 in such a manner that they can be freely rotated. Therefore, if a motor 76 is driven, the weight 62 is moved in the direction of the arrows A - B along the beam 56 by means of belt 70. That is, similar to the air pressure control device 50 described above, the air pressure control device 52 is able to control the rigidity of blade 14 by moving weight 62.

Figure 7:
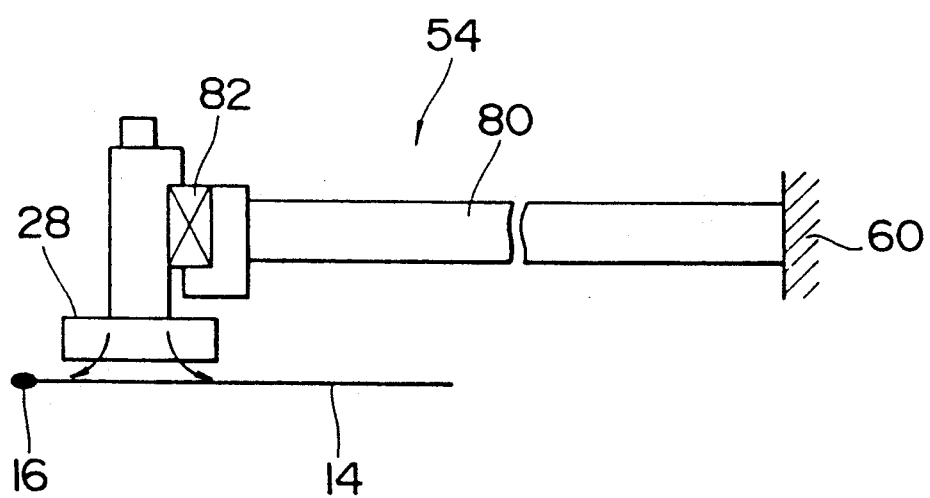
FIG. 7 is a side view of another modification of the embodiment shown in FIG. 5.

Referring now to FIG. 7, there is shown a further air pressure control device 54 which is a modification of the air pressure control device 50 shown in FIG. 5. The air pressure control device 54 includes a beam 80. The beam 80 has a right end portion which is supported in a cantilever manner by the slicing machine main body 60, and in the left end portion of the beam 80, an air pad moving mechanism 82 is provided (for example, a piezoelectric element). According to this structure, if a voltage is applied to the piezoelectric element 82, then the piezoelectric element 82 is operated to move the air pad, 28 in a vertical direction. In this manner, similar to the above-mentioned air pressure control devices 50 and 52, the present air pressure control device 54 is able to control the rigidity of the blade 14 by moving the air pad 28 to control the air pressure of blade 14.

Figure 4:
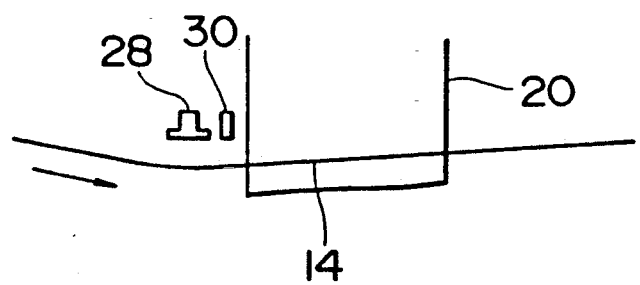
FIG. 4 is a section view taken along the line 3—3 in FIG. 2, illustrating a case where an air pad is used.

Also, as shown in FIG. 4, a single air pad 28 may be provided so that the blade can be inclined obliquely for slicing.

In the above embodiment, although a single air pad 28 is provided on only one side of the blade 14, two air pads 28 may be provided on both sides of the blade 14.

The blade can also be bent by use of hydraulic pressure to other axial pressure applying means can also be used.

Further, in the above mentioned embodiment, the air pressure control device 32 is arranged such that it returns the blade 14 to the reference position. However, the present invention is not limited to this feature. Alternatively, a necessary slicing curve (that is, a wafer shape curve) may be previously input in the control unit 26 and the air pressure adjusting device 32 may be controlled along the slicing curve to thereby slice out a wafer. In this case as well, the blade 14 has a higher rigidity than the conventional blades and, for this reason, it is possible to slice out a wafer having a shape closer to an ideal slicing curve when compared with the prior art blades.

As described heretofore, in a slicing method by use of a slicing machine according to the invention, the inner peripheral cutting edge of the blade is previously displaced to increase the rigidity of the blade. Wafers thus can be sliced from an ingot while the inner peripheral cutting edge is highly rigid, providing a highly accurate cutting operation.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A slicing machine for slicing a crystal ingot in thin pieces, the crystal ingot being supported for movement in a first direction, the slicing machine comprising:
   a chuck body;
   a doughnut-shaped rotary blade supported by said chuck body at an outer edge and having an inner cutting edge; and
   means for applying an axial force to said rotary blade prior to starting of the slicing to thereby displace said inner cutting edge in an axial direction with respect to the outer edge of said rotary blade, wherein the crystal ingot is sliced while said inner cutting edge of said rotary blade is displaced and said means for applying an axial force controls the axial displacement of the inner cutting edge of said rotary blade by applying air pressure to the inner cutting edge of said rotary blade, said axial displacement of the inner cutting edge of said rotary blade being achieved by varying a clearance between said means for applying an axial force and said inner cutting edge of said rotary blade.

2. The slicing machine of claim 1, wherein said means for applying an axial force comprises at least one air pad.

3. The slicing machine of claim 1, further comprising:
a cantilever beam supported by the slicing machine;
a plate spring between said cantilever beam and the slicing machine providing the support; and
an end of said cantilever beam away from said plate spring having said means for applying an axial force mounted thereto, wherein varying of the clearance between said means for applying an axial force and the inner cutting edge of said rotary blade is achieved by moving a weight along said cantilever beam.

4. The slicing machine of claim 1, further comprising:
a cantilever beam supported by the slicing machine at one end;
a drive mechanism mounted at an opposite end of said cantilever beam, said drive mechanism having said means for applying an axial force mounted thereto, wherein said drive mechanism advances and retracts said means for applying an axial force with respect to the inner cutting edge of said rotary blade to achieve a variation in clearance between said means for applying an axial force and the inner cutting edge of said rotary blade.

5. The slicing machine of claim 1, further comprising:
blade sensing means for detecting the axial displacement of the inner cutting edge of said rotary blade prior to starting slicing to establish a reference position; and
control means for ensuring the inner cutting edge of said rotary blade is situated at the reference position during slicing.

6. The slicing machine of claim 5, wherein said control means controls the position of the inner cutting edge of said rotary blade in such a manner that the inner cutting edge of said rotary blade is moved along a predetermined slicing curve.

7. The slicing machine of claim 1, wherein the axial displacement of the inner cutting edge of said rotary blade is achieved by varying the pressure of the air.

8. The slicing machine of claim 7, wherein varying of the pressure of the air is achieved by using an air pressure control device.

9. The slicing machine as claimed in claim 1, wherein the pressure of the air jetted from said means for applying an axial force to said inner cutting edge of said rotary blade is constant.

10. A slicing machine for slicing an ingot into thin wafers, the slicing machine comprising:
an ingot support means for holding the ingot and moving the ingot to and through a slicing position;
a chuck body;
a doughnut-shaped rotary blade mounted by stretching onto said chuck body, an inner peripheral cutting edge of said rotary blade cutting the ingot;
at least one air pad being means for applying an axial force in a vicinity of said inner peripheral cutting edge prior to slicing to produce a displacement of said rotary blade in the vicinity of said inner peripheral cutting edge and providing rigidity thereto, said at least one air pad proximate the slicing position;
at least one sensor for detecting the position of said inner peripheral cutting edge;
a control means for adjusting the axial force applied for positioning said inner peripheral cutting edge of said rotary blade to the determined position by said at least one air pad based upon an input of said at least one sensor;
a cantilever beam supported by the slicing machine at one end; and
a drive mechanism mounted at an opposite end of said cantilever beam, said drive mechanisms having means for applying an axial force mounted thereto, wherein said drive mechanism advances and retracts said means for applying an axial force with respect to said inner peripheral edge of said rotary blade to achieve a variation in clearance between said means for applying an axial force and said rotary blade.

11. The slicing machine of claim 10, wherein said control means controls the position of said inner peripheral cutting edge of said rotary blade in such a manner that said inner peripheral cutting edge of said rotary blade is moved along a predetermined slicing curve.

12. Said inner peripheral cutting edge of said slicing machine of claim 10, wherein the axial displacement of the rotary blade is achieved by varying the pressure of the air using an air pressure control device.

13. A slicing machine for slicing an ingot into thin wafers, the slicing machine comprising:
an ingot support means for holding the ingot and moving the ingot to and through a slicing position;
a chuck body;
a donut-shaped rotary blade mounted by stretching onto said chuck body, an inner peripheral cutting edge of said rotary blade cutting the ingot;
at least one air pad being means for applying an axial force in a vicinity of said inner peripheral cutting edge prior to slicing to produce a displacement of said rotary blade in the vicinity of said inner peripheral cutting edge and providing rigidity thereto, said at least one air pad proximate the slicing position;
at least one sensor for detecting the position of said inner peripheral cutting edge;
control means for adjusting the axial force applied for positioning said inner peripheral edge of said cutting blade to the determined position by said at least one air pad based upon the input of said at least one sensor;
a cantilever beam supported by the slicing machine;
a plate spring between said cantilever beam and the slicing machine providing the support; and
an end of said cantilever beam away from said plate spring having said means for applying an axial force mounted thereto, wherein varying of a clearance between said means for applying an axial force and said rotary blade is achieved by moving a weight along said cantilever beam.

* * * * *